July 7, 1942.  G. H. BROWN  2,288,781
RADIO FREQUENCY WATTMETER
Filed Oct. 17, 1939
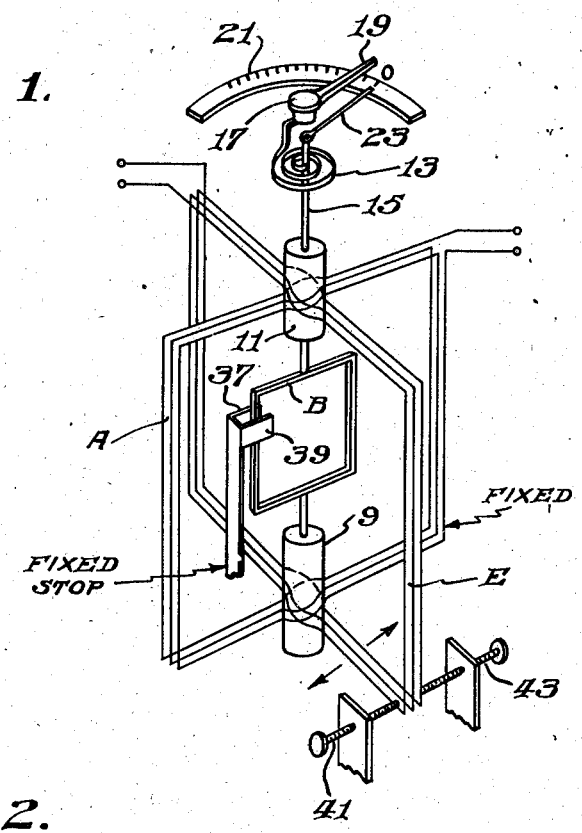
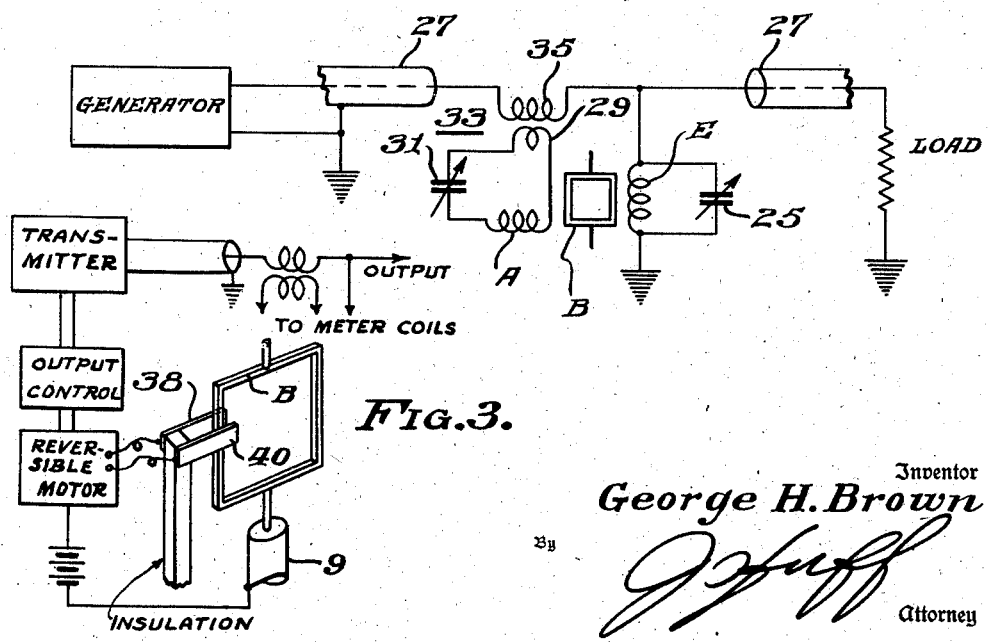
Inventor
George H. Brown
By
Attorney Patented July 7, 1942

2,288,781

UNITED STATES PATENT OFFICE 2,288,781

RADIO FREQUENCY WATTMETER

George H. Brown, Haddonfield, N. J., assignor to Radio Corporation of America, a corporation of Delaware Application October 17, 1939, Serial No. 299,820

12 Claims. (Cl. 171—95)

This invention relates to indicators, and more particularly to a radio frequency wattmeter.

Induction disc wattmeters for measuring power consumption in circuits energized by low frequency alternating currents are well known. The use of such meters to measure the power consumption in circuits energized by radio frequency currents is impracticable due to the high iron losses and the phase distortion produced in the meter. A simple, rugged meter which would provide an accurate measure of radio frequency power would be very useful. It is the primary purpose of this invention to provide such a meter.

This invention will be better understood from the following description when considered in connection with the accompanying drawing, and its scope is indicated by the appended claims. Referring to the drawing, Figure 1 is a perspective view of a meter constructed in accordance with this invention; Figure 2 is a circuit diagram illustrating the electrical connections of the device illustrated in Fig. 1; and Figure 3 is a view illustrating a modification of the rotor stop arrangement.

The construction of the meter which is illustrated in Fig. 1 is intended to be merely illustrative of its essential elements and its mode of operation. The actual mechanical details of its design may be in accordance with the usual practice and therefore they have not been illustrated.

Referring to Fig. 1, the meter comprises a pair of coils A and E which are mounted symmetrically with respect to the common axis which is defined by the intersection of the perpendicular planes containing the coils.

A rotatable member B, described in detail hereinafter, is mounted between two bearings 9 and 11 for limited rotation within the deflecting coils about their common axis. The rotor B is maintained in a normal position in the plane of the deflecting coil A by means of a hair spring 13, which applies a biasing force against rotation of the rotor in either direction. The inner end of the hair spring is fastened to the rotor shaft 15 while its outer end is fastened to a rotatable knob 17 having a pointer 19 which is associated with a calibrated scale 21. The hair spring is so adjusted that when the pointer 19 is in register with "zero" on the calibrated scale, the rotor B is in the plane of the deflecting coil A.

Rotor shaft 15 also carries a pointer 23 which is a rotor position indicator and which is in register with a reference, such as the "zero" on the calibrated scale 21, when the rotor B is in its normal position. It is not necessary to use the same "zero" mark for the two pointers 19 and 23, however, and the latter may be provided with any suitable reference mark. When operated as a wattmeter, the rotor indicator is returned to its initial position, so that it need not be associated with a calibrated scale. When operated as a power output monitor, the rotor indicator displacement may conveniently be calibrated in terms of deviation from a predetermined level.

The inductance of the deflecting coils must be chosen with the desired range of operating frequencies in mind. The two coils are tuned to resonance at the operating frequency by suitable variable capacitors. The electrical circuit for operating the meter to measure the power consumed by a load is illustrated in Fig. 2, to which reference is now made.

Coils A and E are the deflecting coils which bear the same reference letters in Fig. 1. Deflecting coil E is the "voltage" coil of the wattmeter. It is tuned to resonance by a variable capacitor 25. The parallel circuit is connected across the transmission line 27 in which the real power component is to be measured. Since the impedance across a shunt resonant circuit is very high, no appreciable load is presented to the line. A circulating current is induced in the shunt circuit. The amplitude of the circulating current, at any instant, corresponds to the amplitude of the voltage across the transmission line 27.

Deflecting coil A is the "current" coil of the wattmeter. This coil is connected in series with a low impedance coupling coil 29 and a variable capacitor 31. The circuit is tuned to resonance at the operating frequency. Coil 29 is the secondary of a closely coupled transformer 33, the primary 35 of which is connected in series with one conductor of the transmission line 27. A circulating current is induced in the resonant circuit. The amplitude of the circulating current, at any instant, corresponds to the amplitude of the current flowing in transmission line 27.

The theory of operation of this instrument as a wattmeter for measuring radio frequency power will now be explained. Consider, first, the effect of a radio frequency current in the current coil A. Assuming no current in the voltage coil E, when the rotor B is exactly in the plane of the current coil, that is, when the rotor is in its normal or initial position, there is no deflecting torque exerted on it. The inductive coupling between the current coil A and the rotor B is a maximum, and a voltage $e_B$ is induced in it which is expressible by the equation $$e_B = -M_{AB}\frac{di_A}{dt} = -\omega M_{AB} I_A \cos \omega t \quad (1)$$

where:

$M_{AB}$ = coefficient of coupling from coil A to coil B
$I_A$ = peak current in coil A.

Consequently, the current $i_B$ in the rotor B is:

$$i_B = \frac{-\omega M_{AB} I_A}{\sqrt{R_B^2 + \omega^2 L_B^2}} \cos (\omega t - \alpha) \quad (2)$$

where:

$R_B$ = resistance of the rotor B;
$L_B$ = inductance of the rotor B; and $$\alpha = \tan^{-1} \frac{\omega L_B}{R_B}$$

Consider now the effect of deflecting coil E alone, assuming no current in deflecting coil A. It is apparent that no voltage is induced in the rotor B since the rotor is perpendicular to the deflecting coil and their mutual coupling is zero. Since no voltage is induced by deflecting coil E in the rotor B, when the rotor is in its initial position, no current flows in the rotor, and there is no torque produced.

Consider the combined effect of the two perpendicular deflecting coils, however. The current induced in the rotor by the current coil A produces a flux which reacts with the flux produced by the voltage coil E to produce a rotating torque which tends to turn the rotor against the force of the restraining bias. The current $i_E$ in the voltage coil E is:

$$i_E = I_E \sin (\omega t + \theta) \quad (3)$$

where $I_E$ is the peak current in coil E, and the instantaneous torque T tending to rotate the rotor B is: $T = K_1 i_E i_B$, and substituting (3) and (2)

$$T = (I_E \sin (\omega t + \theta)) \left( \frac{-M_{AB} I_A}{\sqrt{R_B^2 + \omega^2 L_B^2}} \cos (\omega t - \alpha) \right) K_1 \quad (4)$$

which may be expanded $$T = K_1 I_A I_E \left( \frac{-\omega M_{AB}}{\sqrt{R_B^2 + \omega^2 L_B^2}} \right) \sin (\omega t + \theta) \cos (\omega t - \alpha) \quad (5)$$

and $$T = K_1 I_A I_E \left( \frac{-\omega M_{AB}}{\sqrt{R_B^2 + \omega^2 L_B^2}} \right) [\sin^2 \omega t \sin \alpha \cos \theta +$$
$$\cos^2 \omega t \sin \theta \cos \alpha +$$
$$\sin \omega t \cos \omega t (\cos \theta \cos \alpha + \sin \theta \sin \alpha)] \quad (6)$$

The average torque, $T_{av}$, is obtained from the $\sin^2 \omega t$ and $\cos^2 \omega t$ terms, since the average of the $\sin \omega t \cos \omega t$ term is zero. Thus $$T_{av} = \frac{K_1 I_A I_E}{2} \left( \frac{-\omega M_{AB}}{\sqrt{R_B^2 + \omega^2 L_B^2}} \right) [\sin \alpha \cos \theta + \cos \alpha \sin \theta] \quad (7)$$

Since $$\sin \alpha = \frac{\omega L_B}{\sqrt{R_B^2 + \omega^2 L_B^2}}$$

and $$\cos \alpha = \frac{R_B}{\sqrt{R_B^2 + \omega^2 L_B^2}}$$

when $R_B \ll \omega L_B$, $\cos \alpha \doteq 0$, and $\sin \alpha \doteq 1$ (8)

from which (8) becomes $$T_{av} = \frac{-K_1 I_A I_B}{2} \frac{M}{L_B} \cos \theta = \frac{KM}{2L_B} (I_A I_E \cos \theta) \quad (9)$$

The torque, that is, the force tending to turn the rotor, is proportional to the product of the currents $I_A$ and $I_E$ and the cosine of the phase angle between them. Since the currents $I_A$ and $I_E$ have the same relative phase as the current and voltage in the line to which the meter is connected, it is apparent that the torque is also proportional to the power being delivered by the line.

Inasmuch as certain conditions have been assumed in deriving Equation 9, it is necessary to consider how the present invention is to be designed to fulfill these conditions. The first condition is that the rotor is parallel to the plane of one deflecting coil A and perpendicular to the plane of the other deflecting coil E. If the rotor B is allowed to turn in response to the torque to which it is subjected, this first condition will be violated. The turning force must be measured, therefore, when the rotor is still in its initial position. The conventional meter movement cannot be used in the present instance therefore, since the deflection of the rotor would not be proportional to power.

In accordance with this invention, therefore, when the deflecting coils are energized and the rotor turns from its initial position, the bias on the rotor is increased by turning the rotatable pointer 19 in the proper direction until the increased turning movement of the hair spring equals the displacing force, and the rotor is restored to its initial position. The turning movement, or displacement, of the hair spring 13 is then proportional to power, and the scale 21, associated with the rotatable pointer 19, can be calibrated to read directly in terms of power.

Since the actual measurement is always made after the rotor B has been restored to its normal position, the degree of rotation of the rotor may be limited to a small value by means of fixed stops 37, 39 which are located in any convenient manner to prevent extensive movement of the rotor.

The accuracy of the instruments depends upon the operator's ability to return the rotor exactly to its initial position. To facilitate this operation the rotor is equipped with a small pointer 23 which is in register with a reference mark when the rotor is in its neutral position.

Another assumption which has been made is that the resistance $R_B$ of the rotor is very much less than the reactance $\omega L_B$ at the operating frequency (Equation 9). This is accomplished by making the rotor of a single closed loop, as illustrated, or the rotor may be a solid square or circular disc, similar to the disc of a low frequency wattmeter, but preferably much smaller and lighter. A small aluminum disc the size of a ten-cent piece has proven satisfactory.

The assumption was also made that the current in either deflecting coil alone produced no torque on the rotor. A mechanical adjustment of the coils will probably not be sufficient to accomplish the necessary orientation. It is proposed, therefore, to determine by experiment the position for each instrument in which the described condition is satisfied. The rotor B is aligned with deflecting coil A by means of the knob 17. An alternating current is then applied to coil A only, and the deflection of the rotor, if any, noted. The knob 17 is then readjusted until successive applications of the current to coil A produce no change in the position of the rotor. The calibrated scale is then adjusted to align the scale "zero" with pointer 19. The condition that the current in coil A alone produces no torque on the rotor has thus been satisfied.

The alternating current is then removed from coil A and applied to the other deflecting coil E. If the rotor tends to rotate the position of the deflecting coil is adjusted by means of the set screws 41, 43 until no deflection is produced by successive applications of the current. The instrument is then properly aligned, and these adjustments need not be made again.

While I have illustrated a hair spring bias for controlling the rotor B, other types of springs may, of course, be utilized. The coils need not be rectangular, as illustrated, but may take any desired shape. The size of the coils is a matter of choice which is influenced, for example, by the desired power capacity of the instrument. Large currents are induced in the low impedance rotor, and appreciable heating may be noticed if it is made too small.

By the modification of the fixed stop illustrated in Fig. 3, the wattmeter illustrated in Fig. 1 may be used to monitor or control the output of a radio frequency oscillator or a broadcast transmitter. The two fixed stops 37 and 39 of Fig. 1 may be insulated from each other to form two contact points 38 and 40. In conjunction with the rotor B, the contact points may be used as a sensitive single-pole double-throw switch.

One proposed application involves the use of this instrument, modified as suggested above, so as to operate a light, or other indication, when the rotor B is deflected sufficiently to touch either one of the two contact points. By setting the operating knob 17 at a predetermined point on the scale, corresponding, for example, to the rated output of a broadcast transmitter, the wattmeter may be used as a monitor to indicate any deviation from the predetermined output.

Another use to which such a modified wattmeter may be put is that of controlling the output of a transmitter. When the wattmeter is coupled to the antenna circuit of a transmitter, and the instrument set to indicate the desired output, the rotor B will change from its normal position when the output of the transmitter varies from its normal value. The switch contacts may be connected to a reversible motor which is used to vary the transmitter output in a direction which will increase or decrease the transmitter output, as the case may be, to restore the rotor B to its normal position. It is apparent, therefore, that this meter not only provides an accurate means for measuring radio frequency power, but, by a simple modification, becomes highly useful as a monitor, or as a control mechanism to maintain the output of a radio transmitter at a predetermined level.

I claim as my invention:

1. A radio frequency wattmeter comprising a pair of deflecting coils positioned in mutually perpendicular planes, a deflectable member mounted for rotation about an axis defined by the intersection of said planes, biasing means for maintaining said member in an initial position in the plane of one of said coils, means for tuning said one coil to resonance at said radio frequency, and means for displacing said bias means to return said member to said initial position when subject to the deflecting forces of said coils.

2. A radio frequency wattmeter comprising a pair of deflecting coils for producing a region of intersecting mutually perpendicular magnetic lines of force, means for resonating said coils at said radio frequency, means for inducing currents in said coils corresponding, respectively, to the instantaneous current and voltage in a power consuming circuit, a deflectable member mounted for rotation within said field about an axis perpendicular to said lines of force, spring biasing means for maintaining said deflectable member in an initial position perpendicular to the lines of force from one of said coils, means for displacing said bias means to return said member to said initial position against the action of said lines of force, and means for indicating the amount of said displacement whereby the power in said power consuming circuit may be determined.

3. A radio frequency wattmeter having a pair of mutually perpendicular deflecting coils, means for resonating said coils at said radio frequency, a deflectable rotor comprising a closed conductive loop mounted for rotation about an axis which contains said coils, spring biasing means connected to said rotor for returning said rotor to an initial position in the plane of one of said coils, means for passing currents through said coils corresponding, respectively, to the current and voltage amplitudes in a power consuming circuit, whereby said rotor is moved from said initial position, means for applying a restoring torque to said rotor to return said rotor to said initial position, and means for indicating the amplitude of said torque as a measure of said power.

4. A radio frequency wattmeter comprising a pair of deflecting coils resonant at said radio frequency for producing intersecting mutually perpendicular lines of magnetic force, a rotor mounted within said coils for rotation about an axis perpendicular to said lines of force, said rotor comprising a closed conductive loop, a rotatable pointer, spring bias means connecting said rotor to said pointer so that in the zero position of said pointer said rotor is perpendicular to the lines of force produced by one of said deflecting coils, and means including said pointer for indicating the torque necessary to return said rotor to its zero position against the torque produced by said lines of force.

5. A radio frequency wattmeter comprising current and voltage deflecting coils for producing a region of intersecting mutually perpendicular magnetic lines of force, means for resonating said current coil at said radio frequency, a deflectable member mounted for rotation within said region about an axis perpendicular to said lines of force, biasing means for maintaining said member in an initial position perpendicular to the lines of force from said current deflecting coil, and means for varying said bias to return said member to said initial position when subjected to rotational forces by said lines of force.

6. A radio frequency wattmeter comprising current and voltage deflecting coils disposed in substantially perpendicular planes and having a common axis, means for adjustably rotating said voltage coil, a rotor within said coils and mounted for rotation about said common axis, said rotor comprising a closed conductive loop, spring bias means for maintaining said rotor in the plane of said current coil so that no torque is exerted on said rotor by currents in said current coil alone, said voltage coil being adjusted to a position in which no torque is exerted on said rotor by currents in said voltage coil alone, means for resonating said current coil at said radio frequency, means for inducing currents in said current coil corresponding to currents in a circuit to be measured, means for connecting said voltage coil to said circuit whereby said rotor tends to rotate, means for increasing said spring bias to return said rotor to its initial position, and means for indicating the increase in said bias.

7. A radio frequency alternating current meter comprising a pair of deflecting coils mounted in perpendicular planes and having a common axis, means for tuning said coils to resonance at said radio frequency, a rotor rotatable about said common axis whose inductance is large with respect to its resistance, adjustable bias means for normally maintaining said rotor in an initial position in the plane of one of said coils, and means for indicating the readjustment of said bias required to return said rotor to said initial position against the deflecting force due to currents induced in said rotor by the resultant field produced by currents in said deflecting coils.

8. A radio frequency wattmeter comprising a pair of coils for producing mutually perpendicular magnetic fields whose intensities correspond, respectively, to the current and voltage amplitudes in a power consuming circuit, a single turn rotor mounted for limited rotation about an axis defined by the intersection of said fields, adjustable bias means attached to said rotor opposing the turning torque produced in said rotor by currents induced therein by said fields, and means for indicating the position of said rotor with respect to said coils.

9. In a radio frequency wattmeter, the combination comprising current and voltage responsive deflecting coils disposed in substantially perpendicular planes and having a common axis, a single turn rotor mounted in the plane of said current responsive coil and rotatable about said common axis in response to a torque produced by currents induced in said rotor by said deflecting coils, and means for measuring said torque while maintaining said rotor in the plane of said current responsive coil.

10. In a radio frequency wattmeter, the combination comprising a pair of deflecting coils disposed in substantially perpendicular planes and having a common axis, a rotor comprising a closed coil having an inductance which is high with respect to its resistance, said rotor being mounted for rotation about said common axis and lying in the plane of one of said deflecting coils and perpendicular to the plane of the other of said coils, said rotor coil being energized solely by the resultant field produced by said deflecting coils, and means for indicating the rotational torque applied to said rotor by current flowing in said deflecting coils.

11. A device of the character described in claim 9 in which said means for indicating the rotational torque applied to said rotor comprises an adjustable spring bias means.

12. In a radio frequency wattmeter, the combination comprising first and second deflecting coils disposed in substantially perpendicular planes for producing mutually perpendicular magnetic fields whose intensities correspond, respectively, to the current flowing through and the voltage across a circuit whose power consumption is to be measured, a single turn rotor mounted in the plane of the first of said deflecting coils and rotatable about an axis formed by the intersection of said planes, adjustable bias means for applying a torque to said rotor which is equal and opposite to the torque produced by currents induced in said rotor, whereby said rotor remains in the plane of said first deflecting coil, and means for indicating the amplitude of the applied torque as a measure of the power consumption of said circuit.

GEORGE H. BROWN.